(12) United States Patent
Smith

(10) Patent No.: US 10,975,794 B2
(45) Date of Patent: Apr. 13, 2021

(54) METHOD OF FAULT ISOLATION FOR SYSTEMS WITH EXISTING DIAGNOSTICS

(71) Applicant: Cummins Inc., Columbus, IN (US)

(72) Inventor: Daniel J. Smith, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 16/616,274

(22) PCT Filed: May 25, 2018

(86) PCT No.: PCT/US2018/034596
§ 371 (c)(1),
(2) Date: Nov. 22, 2019

(87) PCT Pub. No.: WO2018/218124
PCT Pub. Date: Nov. 29, 2018

(65) Prior Publication Data
US 2020/0158041 A1 May 21, 2020

Related U.S. Application Data

(60) Provisional application No. 62/511,379, filed on May 26, 2017.

(51) Int. Cl.
*F02D 41/22* (2006.01)
*G07C 5/00* (2006.01)
*G07C 5/08* (2006.01)

(52) U.S. Cl.
CPC .......... *F02D 41/221* (2013.01); *G07C 5/008* (2013.01); *G07C 5/0808* (2013.01);
(Continued)

(58) Field of Classification Search
CPC .......... F02D 41/221; F02D 2041/224; G07C 5/0808; G07C 5/0841; G07C 5/0816; G07C 5/008
See application file for complete search history.

(56) References Cited

U.S. PATENT DOCUMENTS 6,748,304 B2 6/2004 Felke et al.
7,136,794 B1 11/2006 Bechhoefer
(Continued)

FOREIGN PATENT DOCUMENTS

WO 2008054309 A1 5/2008

OTHER PUBLICATIONS

International Search Report and Written Opinion issued by the ISA/US, Commissioner for Patents, dated Aug. 29, 2018, for International Application No. PCT/US2018/034596; 8 pages.
(Continued)

*Primary Examiner* — Sizo B Vilakazi
(74) *Attorney, Agent, or Firm* — Faegre Drinker Biddle & Reath LLP

(57) ABSTRACT

A method (50) for isolating a fault within an engine system (10) including an engine control module (40) and a diagnostics module (36) includes determining, by the engine control module (40), a plurality of parameters of the engine system (10), calculating a likelihood of the fault using a log-likelihood ratio analysis of data within the engine control module (40), and providing a plurality of fault determinations and the likelihood of each of the plurality of fault determinations using plurality of parameters and the diagnostics module (36) of the engine system (10).

20 Claims, 4 Drawing Sheets

(52) U.S. Cl.
CPC ......... *G07C 5/0816* (2013.01); *G07C 5/0841* (2013.01); *F02D 2041/224* (2013.01)

(56) References Cited

U.S. PATENT DOCUMENTS

| | | |
|---|---|---|
| 8,001,423 B2 | 8/2011 | Spier et al. |
| 8,380,447 B2 | 2/2013 | Bechhoefer |
| 8,498,776 B2 | 7/2013 | Singh et al. |
| 2003/0195681 A1* | 10/2003 | Rother ................. G07C 5/0808 701/29.6 |
| 2004/0230384 A1* | 11/2004 | Haynes ............... F04D 15/0088 702/57 |
| 2009/0299602 A1* | 12/2009 | Hartrey ............... F02D 41/1497 701/102 |
| 2013/0305081 A1* | 11/2013 | Agnihotram ....... G05B 23/0262 714/2 |
| 2015/0219530 A1* | 8/2015 | Li .......................... G06F 17/18 702/181 |

OTHER PUBLICATIONS

International Preliminary Report on Patentability received for PCT Patent Application No. PCT/US2018/034596, dated Oct. 15, 2019, 16 pages.

\* cited by examiner

METHOD OF FAULT ISOLATION FOR SYSTEMS WITH EXISTING DIAGNOSTICS

RELATED APPLICATIONS

The present application is a national stage entry of International (PCT) Patent Application Number PCT/US2018/034596, filed May 25, 2018, which in turn claims priority to U.S. Provisional Application No. 62/511,379, filed May 26, 2017, the subject matter of which are expressly incorporated herein by reference.

FIELD OF THE DISCLOSURE

The present invention relates generally to a system and method configured to determine a fault that may affect operation of an engine and, more particularly, to a system and method configured to utilize existing diagnostic information for the engine to isolate the fault from the complete listing of possible fault options for the engine system.

BACKGROUND OF THE DISCLOSURE

In current engine systems, it may be difficult to determine the exact nature of what caused a fault or error in the system. For example, diagnostic systems may be designed to give a general fault or error code but may not be designed to provide more specificity regarding the component which causes the fault or the reason for the fault or error. As a result, the entire engine system may be shut down for long periods of time to properly determine the fault or error in the system. Additionally, if the fault or error is not correctly identified the first time by the user or technician, the engine system will continue to experience issues until the exact nature of the fault or error is identified and repaired or otherwise addressed.

For example, engine systems which are designed and calibrated according to regulatory emissions compliance may include system level monitoring for detecting system level faults or failures, however, the monitoring system may not be required to detect small levels or values of degradation. In this way, it may be difficult to quickly assess if there is a component level failure likely to occur because system level monitoring may merely state that a particular system, not an exact component, is the source of the failure mode. Additionally, a system level failure may be indicated when multiple components are partially degraded at approximately the same time but, because no single component has actually fully degraded or failed yet, it can be challenging for a user, external system, or technician to quickly and accurately assess the source of the system level fault and what components may be causing the fault. In this way and due to the difficulty of accurately assessing a failure of an engine system, the first repair made to an engine system to address a fault may not necessarily be the correct repair.

As such, there is a need for a system and method which improves troubleshooting for engine systems and better identifies the likelihood of the error or fault for a user, technician, or others.

SUMMARY OF THE DISCLOSURE

In one embodiment, a method for isolating a fault within an engine system including an engine control module and a diagnostics module comprises determining, by the engine control module, a plurality of parameters of the engine system, calculating a likelihood of the fault using a log-likelihood ratio analysis of data within the engine control module, providing a plurality of fault determinations and the likelihood of each of the plurality of fault determinations using plurality of parameters and the diagnostics module of the engine system, and controlling the engine system based on the likelihood of each of the plurality of fault determinations.

In one example, the plurality of parameters of the engine system are determined during operation of the engine system, and the method further comprises comparing the plurality of parameters to predetermined threshold parameters for the engine system.

In another example, the method further comprises normalizing the plurality of parameters using statistical analysis, filtering the normalized plurality of parameters based on data from the diagnostics module, calculating a likelihood of the fault using the log-likelihood ratio analysis for each possible failure mode of the engine system, comparing the likelihoods for each of the possible failure modes, and providing instructions to address the possible failure modes with highest likelihoods.

In yet another example, providing instructions includes visually displaying the possible failure modes with the highest likelihoods on a display.

In still another example, the display is present on at least one the engine system and an external tool.

In another embodiment, a method of isolating a fault within an engine system is provided, and includes receiving a plurality of input parameters from the engine system, receiving a plurality of threshold values from the engine system, calculating a plurality of average values and a plurality of weighting vectors based on the plurality of input parameters, calculating a log-likelihood ratio for each of a plurality of failure modes detected in the engine system based on the plurality of input parameters, the plurality of average values, and the plurality of weighting vectors, comparing, using the log-likelihood ratio, the plurality of input parameters to the plurality of threshold values, determining the fault of the engine system by calculating a probability of each of the plurality of failure modes detected in the engine system based on the comparison between the plurality of input parameters and the plurality of threshold values, and controlling the engine system based on the probability of each of the plurality of failure modes detected in the engine system.

In one example, the method further includes normalizing the plurality of input parameters using a statistical analysis to account for one or more inconsistencies.

In another example, the method further includes applying at least one filter to at least one of: the plurality of input parameters and the plurality of threshold values to narrow a list of possible failure modes. In a variation, applying the at least one filter comprises applying a first filter to at least one of: the plurality of input parameters and the plurality of threshold values based on an operating condition of the engine system to remove one or more irrelevant failure modes. In another variation, applying the at least one filter comprises applying a second filter to at least one of: the plurality of input parameters and the plurality of threshold values based on values associated with an incomplete diagnostic process performed in the engine system.

In yet another example, the method further includes ranking the probability of each of the plurality of failure modes based on the log-likelihood ratio calculated for a corresponding failure mode. In a variation, the method further includes providing at least one instruction for correcting the fault of the engine system based on the probability ranking of each of the plurality of failure modes detected in the engine system. In another variation, providing the at least one instruction comprises displaying the at least one instruction on a display device. In yet another variation, providing the at least one instruction comprises transmitting the at least one instruction to a relevant party associated with the engine system.

In yet another embodiment, a diagnostic system of isolating a fault within an engine system is provided and includes an engine control module configured to: receive a plurality of input parameters from the engine system, receive a plurality of threshold values from the engine system. Also included in the diagnostic system is an engine diagnostic module is also configured to: calculate a plurality of average values and a plurality of weighting vectors based on the plurality of input parameters, calculate a log-likelihood ratio for each of a plurality of failure modes detected in the engine system based on the plurality of input parameters, the plurality of average values, and the plurality of weighting vectors, compare, using the log-likelihood ratio, the plurality of input parameters to the plurality of threshold values, and determine the fault of the engine system by calculating a probability of each of the plurality of failure modes detected in the engine system based on the comparison between the plurality of input parameters and the plurality of threshold values, and control the engine system based on the probability of each of the plurality of failure modes detected in the engine system.

In one example, the engine diagnostic module is further configured to normalize the plurality of input parameters using a statistical analysis to account for one or more inconsistencies.

In another example, the engine diagnostic module is further configured to apply at least one filter to at least one of: the plurality of input parameters and the plurality of threshold values to narrow a list of possible failure modes. In a variation, the engine diagnostic module is further configured to apply a first filter to at least one of: the plurality of input parameters and the plurality of threshold values based on an operating condition of the engine system to remove one or more irrelevant failure modes. In another variation, the engine diagnostic module is further configured to apply a second filter to at least one of: the plurality of input parameters and the plurality of threshold values based on values associated with an incomplete diagnostic process performed in the engine system.

In yet another example, the engine diagnostic module is further configured to rank the probability of each of the plurality of failure modes based on the log-likelihood ratio calculated for a corresponding failure mode.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
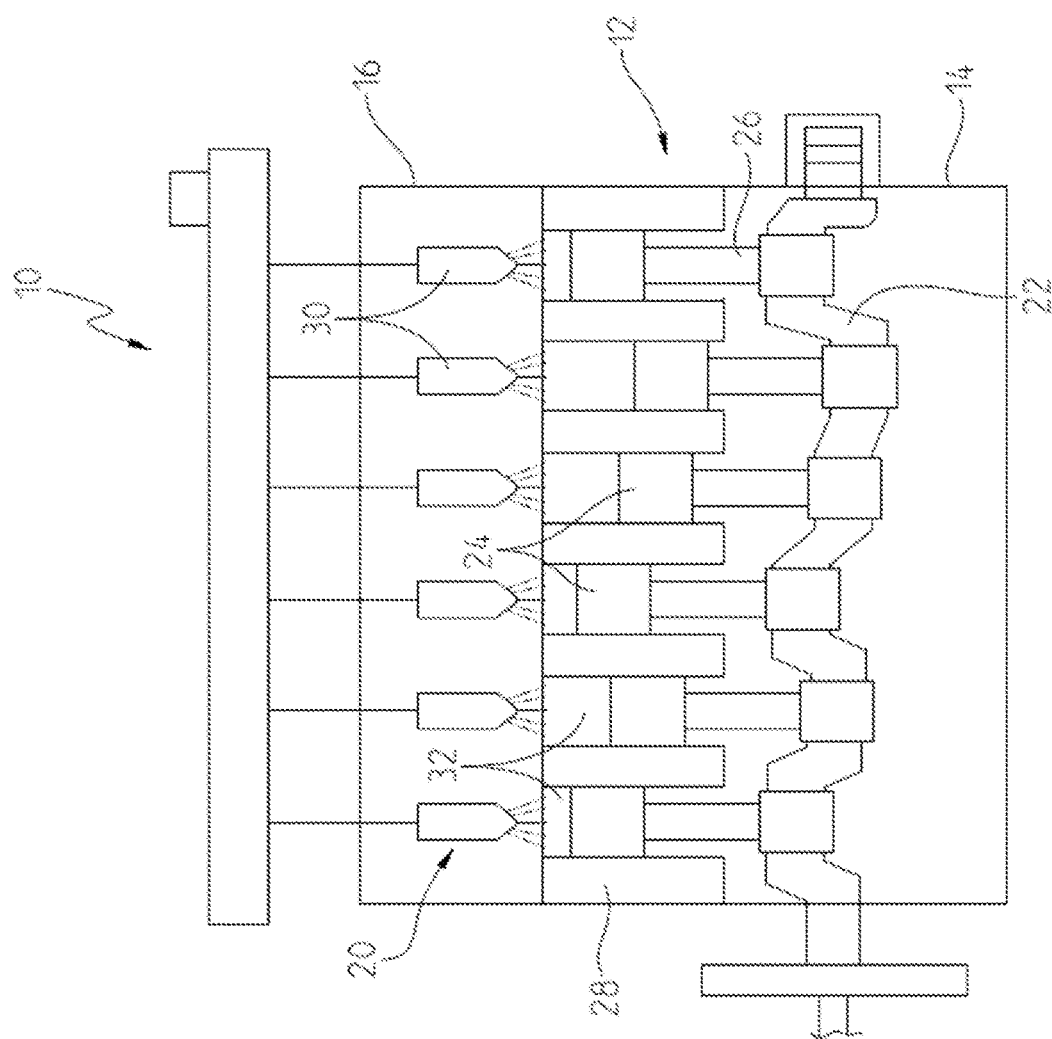
FIG. 1 is a schematic view of an engine system.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Referring to FIG. 1, a portion of an internal combustion engine system 10 is shown as a simplified schematic. Engine system 10 includes an engine body 12, which includes an engine block 14, a cylinder head 16 coupled to engine block 14, and a fuel system 20. Engine body 12 further includes a crankshaft 22, a plurality of pistons 24, and a plurality of connecting rods 26. Pistons 24 are configured for reciprocal movement within a plurality of engine cylinders 28, with one piston 24 positioned in each engine cylinder 28. Each piston 24 is operably coupled to crankshaft 22 through one of connecting rods 26. A plurality of combustion chambers 32 are each defined by one piston 24, cylinder head 16, and cylinder 28. The movement of pistons 24 under the action of a combustion process in engine system 10 causes connecting rods 26 to move crankshaft 22. In one embodiment, engine system 10 may be characterized as a large-bore, high-speed engine. For example, engine system 10 may be a two-stroke engine, a four-stroke engine, a diesel engine, a spark-ignited engine, or any other internal combustion engine.

Referring still to FIG. 1, when engine system 10 is operating, a combustion process occurs in combustion chambers 32 to cause movement of pistons 24. The movement of pistons 24 causes movement of connecting rods 26, which are drivingly connected to crankshaft 22, and movement of connecting rods 26 causes rotary movement of crankshaft 22. Crankshaft 22 drives at least one fuel pump to pull fuel from the fuel tank in order to move fuel toward fuel injectors 30. Control system 18 (FIG. 2) provides control signals to fuel injectors 30 that control operation thereof based on operating parameters for each fuel injector 30, such as the length of time fuel injectors 30 operate and the number of fueling pulses per a firing or injection cycle period, thereby determining the amount of fuel delivered by each fuel injector 30.

Figure 2:
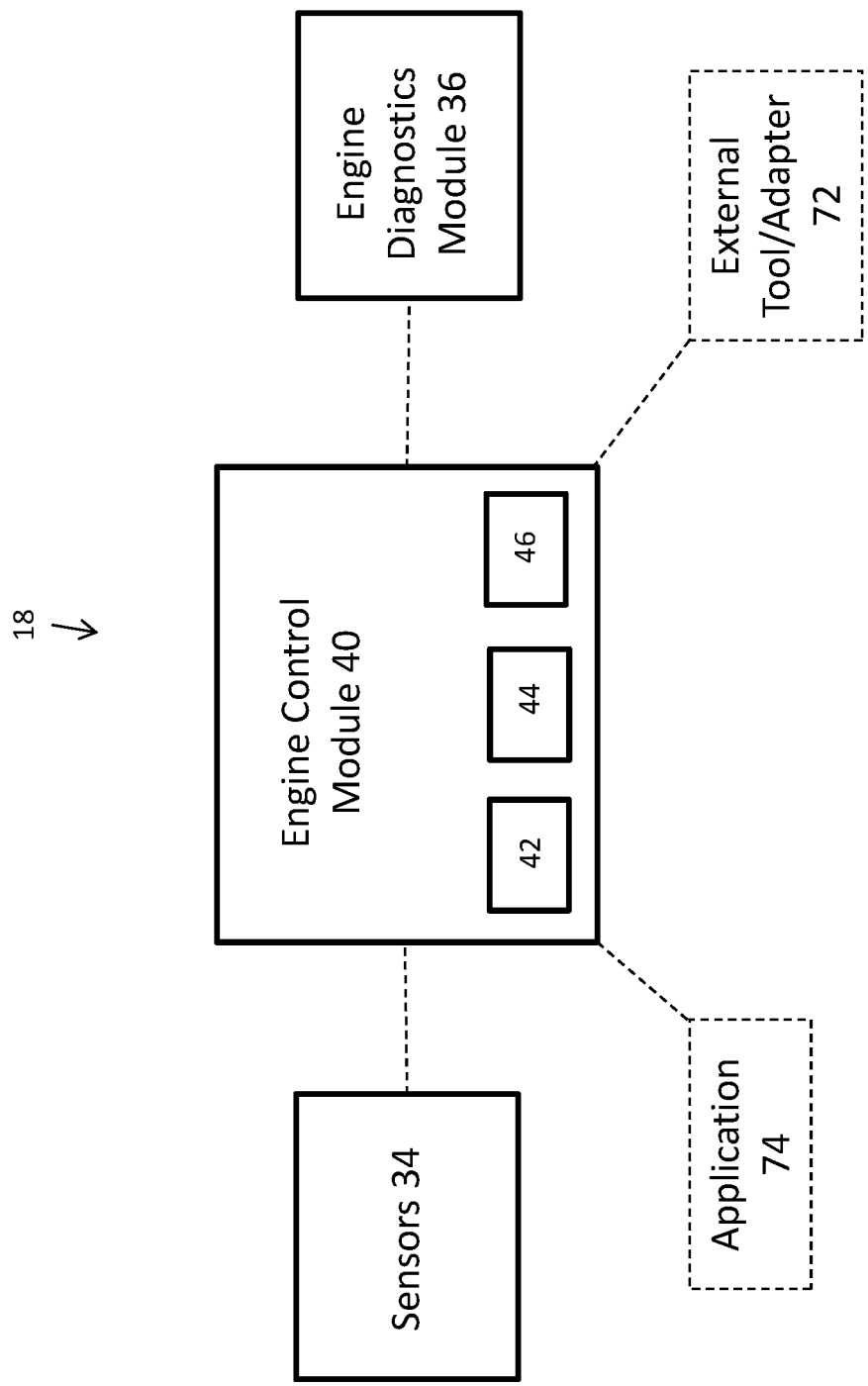
FIG. 2 is a schematic view of a control system of the engine system of FIG. 1.

Referring to FIG. 2, control system 18 controls, regulates, and/or operates the components and/or modules of engine system 10. More particularly, control system 18 may receive signals from various sensors 34 located on engine system 10 and/or an aftertreatment system (not shown) for engine system 10, such as pressure sensors, temperature sensors, time sensors, positional sensors, flow rate sensors, and any other type of sensor configured for use with an engine system, for example a crank angle sensor, an ambient conditions sensor, and a torque sensor. Control system 18 also is configured to transmit/receive control signals or other inputs to devices located on engine system 10 and/or aftertreatment system in order to control or receive data from such devices. Using sensors 34, various parameters of engine system 10 and/or aftertreatment system may be determined, measured, and/or monitored.

Referring still to FIG. 2, control system 18 further includes an engine diagnostics module 36 which may, using information directly from sensors 34, allow control system 18 to determine if a fault or error has occurred within engine system 10. In embodiments, engine system 10 includes other relevant systems, such as an aftertreatment system, to suit different applications. Engine diagnostics module 36 may be responsible for providing an indication that a fault or error has occurred to a user or a technician of engine system 10 and/or may provide information regarding the fault or error to an internal or external display or database. The fault or error may be associated with a particular code or other identifying information that may provide at least some information regarding the fault or error within engine system 10 and/or aftertreatment system. In one embodiment, engine diagnostics module 36 defines the existing and on-board diagnostics provided with engine system 10 and is not a remote or external system.

Control system 18 may include a controller or engine control module ("ECM") 40 and a wire harness (not shown) operably coupled to sensors 34 and engine diagnostics module 36. ECM 40 may be a processor having a memory 42, a transmitter 44, and a receiver 46. For example, actions of control system 18 may be performed by elements of a computer system or other hardware capable of executing programmed instructions, for example, a general purpose computer, special purpose computer, a workstation, or other programmable data processing apparatus. These various control actions also may be performed by specialized circuits (e.g., discrete logic gates interconnected to perform a specialized function), by program instructions (software), such as logical blocks, program modules, or other similar applications which may be executed by one or more processors (e.g., one or more microprocessors, a central processing unit (CPU), and/or an application specific integrated circuit), or any combination thereof. For example, embodiments may be implemented in hardware, software, firmware, middleware, microcode, or any combination thereof. Instructions may be in the form of program code or code segments that perform necessary tasks and can be stored in a non-transitory, machine-readable medium such as a storage medium or other storage(s). A code segment may represent a procedure, function, subprogram, program, routine, subroutine, module, software package, class, or any combination of instructions, data structures, or program statements. A code segment may be coupled to another code segment or a hardware circuit by passing and/or receiving information, data, arguments, parameters, or memory contents. In this way, control system 18 is configured to control operation of engine system 10 and/or aftertreatment system.

Illustratively, ECM 40 is configured to cooperate with engine diagnostics module 36 to determine and assess if and when engine system 10 has a fault or error that may affect operation thereof. More particularly, ECM 40 is configured to execute instructions (e.g., a software program) which perform a method or process that cooperates with engine diagnostics module 36 to individually isolate faults, failures, or errors within engine system 10 and/or aftertreatment system for troubleshooting, repair, and/or adjusting behavior, performance characteristics, or parameters of engine system 10. As disclosed herein, the fault isolation process and method performed by ECM 40 may compare measured values of engine system 10 to threshold values stored or otherwise included in engine diagnostics module 36 to analyze various failure or fault modes of engine system 10 and then perform a log-likelihood ratio test ("LLRT") with respect to various outputs of this comparison to identify the likelihood of a given failure mode, thereby narrowing or filtering the possible faults from all fault options. Because engine diagnostics module 36, like many on-board and existing diagnostics systems for an engine, may provide only generic or general information that a fault has occurred and merely narrow the fault to a particular fault code or other identifier which may be associated with a variety of components, systems, or reasons for the failure mode of engine system 10 and/or aftertreatment system, ECM 40 is configured to cooperate with engine diagnostics module 36 to better narrow or filter the fault options in an effort to isolate the exact failure mode. For example, final measured values from sensors 34 and the threshold values from engine diagnostics module 36, which are used to make pass/fail decisions to determine if a fault or error has occurred, are compared to identify the most likely failure modes, given a set of input data and the current malfunction indication (e.g., fault or failure code or other identifying information).

Figure 3:
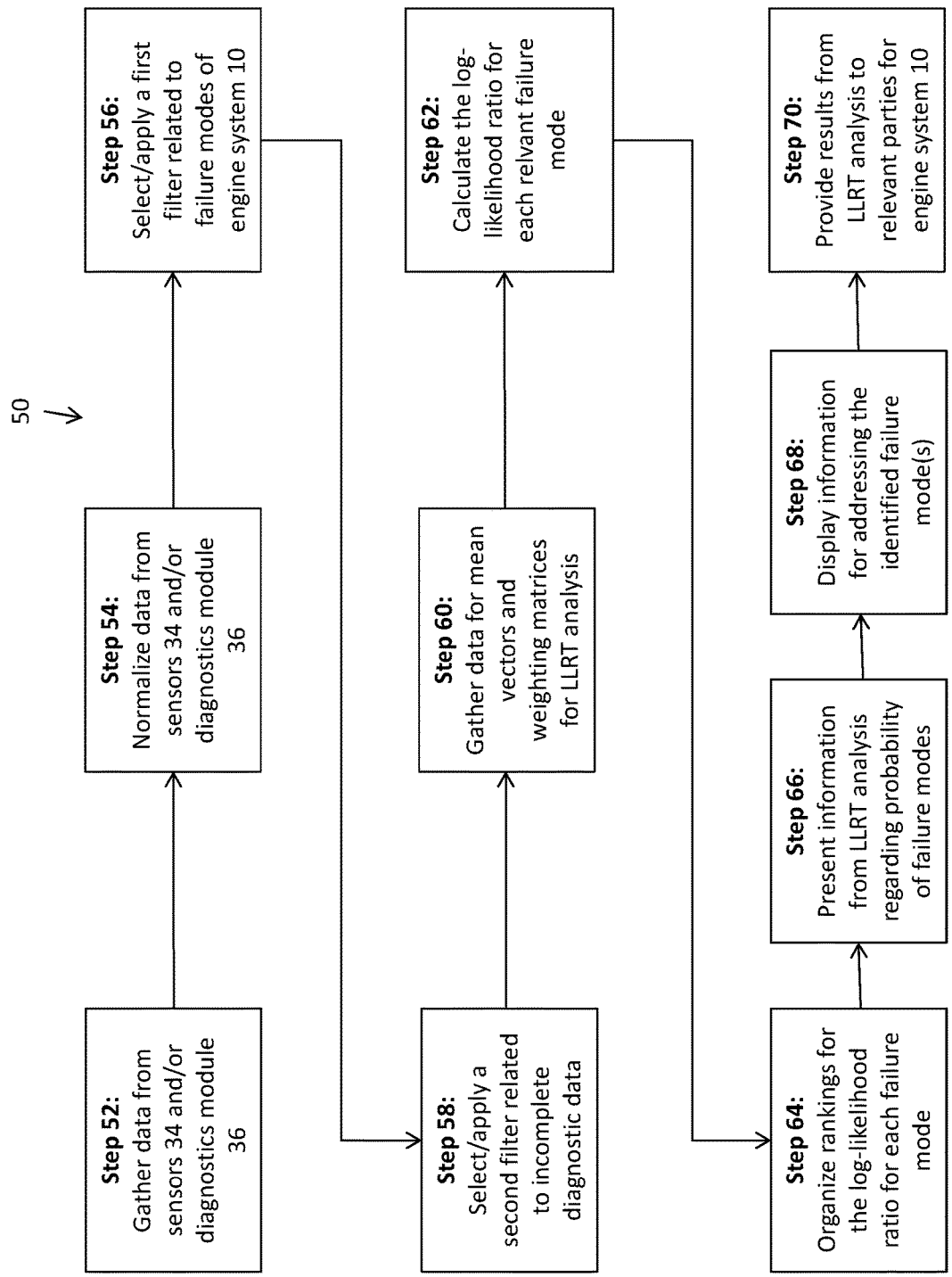
FIG. 3 is a flow chart of an illustrative method of isolating a fault within the engine system.

Referring to FIG. 3, ECM 40 includes an algorithm, instructions, software, or other program configured to perform a diagnostic analysis or method 50 to identify the most likely failure modes, thereby narrowing the complete list of possible failure modes to those with only the highest probability of indicating the fault or error of engine system 10. As such, method 50 is configured to isolate the given failure from the potential listing of possible codes or modes of engine system 10 (e.g., 100+ possible failure modes/codes).

First, in Step 52 of method 50, ECM 40 communicates with sensors 34 to gather or determine a plurality of data, inputs, and other information from the various systems and components of engine system 10. In this way, in Step 52, ECM 40 determines a complete listing of the current measurements, values, or status of various components, modules, and systems of engine system 10 which were obtained during operation of engine system 10 such that the diagnostics system obtains information directly from sensors 34. For example, using the data from sensors 34, the diagnostics system may calculate a performance metric for the health of a various system, component, or assembly that is being diagnosed (e.g., 20% average position error or 10 kg/min flow error). In this way, the diagnostics system directly communicates with sensors 34 to obtain data/information, however, method 50 does not need to directly communicate with sensors 34 for data inputs because method 50 uses the gathered and/or calculated performance metrics already obtained by the diagnostics system.

Additionally, in Step 52, ECM 40 also communicates with engine diagnostics module 36 to receive threshold values for the various components, modules, and/or systems of engine system 10. The threshold data, information, and inputs from engine diagnostics module 36 may be obtained from an earlier calibration of engine system 10, may be predetermined by the original equipment manufacturer of engine system 10, and/or may be determined by regulatory agencies, for example regulatory emissions compliance standards or guidelines. As such, the information stored or used by engine diagnostics module 36 is pre-calculated and available before method 50 is initiated. In this way, engine diagnostics module 36 does not rely on continuous observation of various parameters or the need to calculate or obtain certain information during later steps of method 50.

Next, in Step 54, the current and threshold data/performance metrics and information from Step 52 may be normalized to account for any numerical inconsistencies or standard deviations between data sets. For example, using known statistical analysis and/or numerical processing, ECM 40 may normalize the input data from sensors 34 and/or engine diagnostics module 36 such that current data inputs may be accurately compared to threshold data values. It may be appreciated that Step 54 is optional such that ECM 40 may not include instructions or a program to perform Step 54 or ECM 40 may determine that Step 54 does not need to be performed at a given time during method 50.

Next in Step 56, ECM 40 may select or apply a first filter to the current and threshold data sets/performance metrics to narrow the list of possible failure modes. For example, engine system 10 may have many (e.g., 100+) failure modes/codes based on the various systems, modules, and components thereof. However, various failure modes may be irrelevant and unnecessary to consider at the time of method 50 given the operating conditions of engine system 10 at the time the failure or fault was indicated, the current and threshold input data received by ECM 40, noise or other irrelevant data in the measurements or values received by ECM 40, and/or other factors. In this way, ECM 40 may be configured to apply a filter to at least initially remove any impossible or highly unlikely failure modes from consideration. It may be appreciated that Step 56 is optional such that ECM 40 may not include instructions or a program to perform Step 56 or ECM 40 may determine that Step 56 does not need to be performed at a given time during method 50.

Next, in Step 58, ECM 40 may apply or select a second filter to the current and/or threshold data sets to remove any "null", "void," or "zero" data inputs that do not accurately reflect the value for a given component, system, or module of engine system 10. For example, if a particular diagnostic process is not completed or even started at the time of method 50, the threshold value may read "zero," "null," or "void" in engine diagnostics module 36 which, if compared to the current value for that component, module, or system received by sensors 34, may result in the appearance of a large discrepancy (and, therefore, the appearance of a possible failure) in that component, system, or module of engine system 10. Yet, because the zero, null, or void value is merely the result of an incomplete diagnostics process, ECM 40 may be configured to exclude or filter such data sets rather than include those data sets in the likelihood analysis for the failure or fault of engine system 10. In one embodiment, the second filter enables engine diagnostic module 36 to use only input data from diagnostics that have been completed. In another embodiment, symptoms or failure indications, such as active fault codes or system errors, are used to identify potential failure modes. Subsequently, the potential failure modes are used to identify related diagnostic results. In one embodiment, only the input data associated with the diagnostic results are used for analysis. In another embodiment, the LLRT is only run against the identified potential failure modes.

Next, in Step 60, ECM 40 may access an external database or information stored internally on engine system 10 (e.g., within memory 42) to gather information related to mean or average values and/or weighting vectors/matrices for the given input values received from sensors 34 and engine diagnostics module 36. These average values and weighting vectors/matrices are used next in Step 62 to arrive at a determination of the most likely causes of the failure or fault within engine system 10.

In Step 62, using the current inputs from sensors 34 (Step 52) obtained/produced by the diagnostics system (i.e., Step 52) may not directly obtain information from sensors 34), the threshold inputs from engine diagnostics module 36 (Step 52), and the average values and weighting vectors/matrices (Step 60), ECM 40 is configured to execute (e.g., via calculations) a log-likelihood ratio for each failure mode (may be the filtered failure modes resultant from Step 56) for a given data snapshot (i.e., for the current value measured or otherwise obtained by sensors 34 during method 50). More particularly, ECM 40 is configured to calculate the log-likelihood ratio using the LLRT analysis shown in Formula (1) below:

$$LLRT = \log_{10} \frac{(x - \mu_{failure})P_{failure}(x - \mu_{failure})^T}{(x - \mu_{healthy})P_{healthy}(x - \mu_{healthy})^T}$$

where "x" is a vector based on the current input, data, or measurement value obtained from sensors 34 for a given component, system, or module (may be normalized in Step 54); "Pfailure" is the weighting matrix for a given failure mode; "Phealthy" is the weighting matrix for a given "healthy" or baseline engine system; "μfailure" is the mean vector for a given failure mode; and "μhealthy" is the mean vector for a given "healthy" or baseline engine system. The determination of (x-μfailure) provides the difference between the current value and the mean value while the determination of Pfailure(x-μfailure)T provides the sensitivity weighting based on variance. The mean vectors and weighting matrices may be calculated based on a physical test performed on engine system 10 and/or using simulated testing related to data for a failed part, component, or system. Additionally, the mean vectors and weighting matrices may be calculated based on results obtained from a vehicle or system in the field that underwent a successful repair or service event.

As an example only, a normalized vector for failed part can be shown as the following:

$$x = [0.0183 \quad 0.0752 \quad 0.8219]$$

$$\mu failure = [0.0104 \quad 0.0259 \quad 0.8895]$$

$$Pfailure = \begin{bmatrix} 44.2534 & 0 & 0 \\ 0 & 14.0875 & 0 \\ 0 & 0 & 82.6569 \end{bmatrix}$$

Numerator = 0.4152

$$\mu healthy = [0.0080 \quad 0.0403 \quad 0.0025]$$

$$Phealthy = \begin{bmatrix} 95.2458 & 0 & 0 \\ 0 & 15.2967 & 0 \\ 0 & 0 & 47.8542 \end{bmatrix}$$

Denominator = 32.1592

$$LLRT = -1.8890$$

In this example, an LLRT significantly less than zero indicates a likely membership in the failure group. P matrices being diagonal are due to limited amount of data used for variability calculation, thus making a complete covariance matrix based solution unreliable for this example.

The LLRT analysis is calculated for each possible failure mode of engine system 10 relative to a "healthy" (i.e., no faults, failures, or errors) engine system. However, it may be appreciated that, because of the filtering steps (e.g., Steps 54 and/or 56), the LLRT analysis based on Formula (1) may be performed for a smaller subset of possible failure modes instead of the complete listing of possible failure modes for engine system 10. As shown in Formula (1), the LLRT analysis generally compares, using a log-likelihood ratio analysis, the current input values from sensors 34 to the threshold data or inputs from engine diagnostics module 36 to determine if a particular parameter, condition, or data value of engine system 10 is outside of a threshold value or range, thereby determining whether a fault has occurred within engine system 10.

Once the calculations using the LLRT analysis for each possible failure mode are completed during Step 62, ECM 40 is configured in Step 64 to compare, determine, or otherwise organize the likelihood information from Step 62 into a ranking, order, list, graph, table, or any other type of results information to present those failure modes with the highest or greatest likelihood of being accurate with the current information regarding engine system 10. For example, in one embodiment, ECM 40 may be configured to determine the "top" five failure modes with the greatest likelihood or probability of being the correct failure mode of engine system 10. In another embodiment, ECM 40 may be configured to determine the isolated, one failure mode with the greatest likelihood of accuracy. Alternatively, ECM 40 may be programmed or otherwise configured to identify any number of failure modes, depicting their associated probability, percentages, or likelihoods of being the correct failure mode for the given conditions of engine system 10. It may be appreciated that ECM 40 is configured to review the data from all calculations performed in Step 62 to develop the order/ranking of likely failure modes because, at times, it may be possible for calculations from multiple components, modules, or systems of engine system 10 to collectively identify a single failure mode.

Following Step 64, method 50 proceeds to Step 66 and ECM 40 is configured to present the information from the LLRT analysis to the operator, a technician, a display, and/or an external database showing the results in a table, graph, chart, alphanumeric listing, or any other type of resultant display of such information such that the operator or technician can easily understand which failure mode has the greatest likelihood (i.e., is the most likely to be correct failure mode of engine system 10). As such, the operator or technician has what is expected to be the correct starting point for assessing the failure of engine system 10. In such an instance where two or more failure modes have similar likelihoods of accuracy, again, the operator or technician still has an accurate starting point for identifying the most probable failure modes, which eliminates the need for the operator or technician to test or cycle through each possible failure mode for engine system 10 in an effort to discover the source of the fault or failure of engine system 10.

Figure 4:
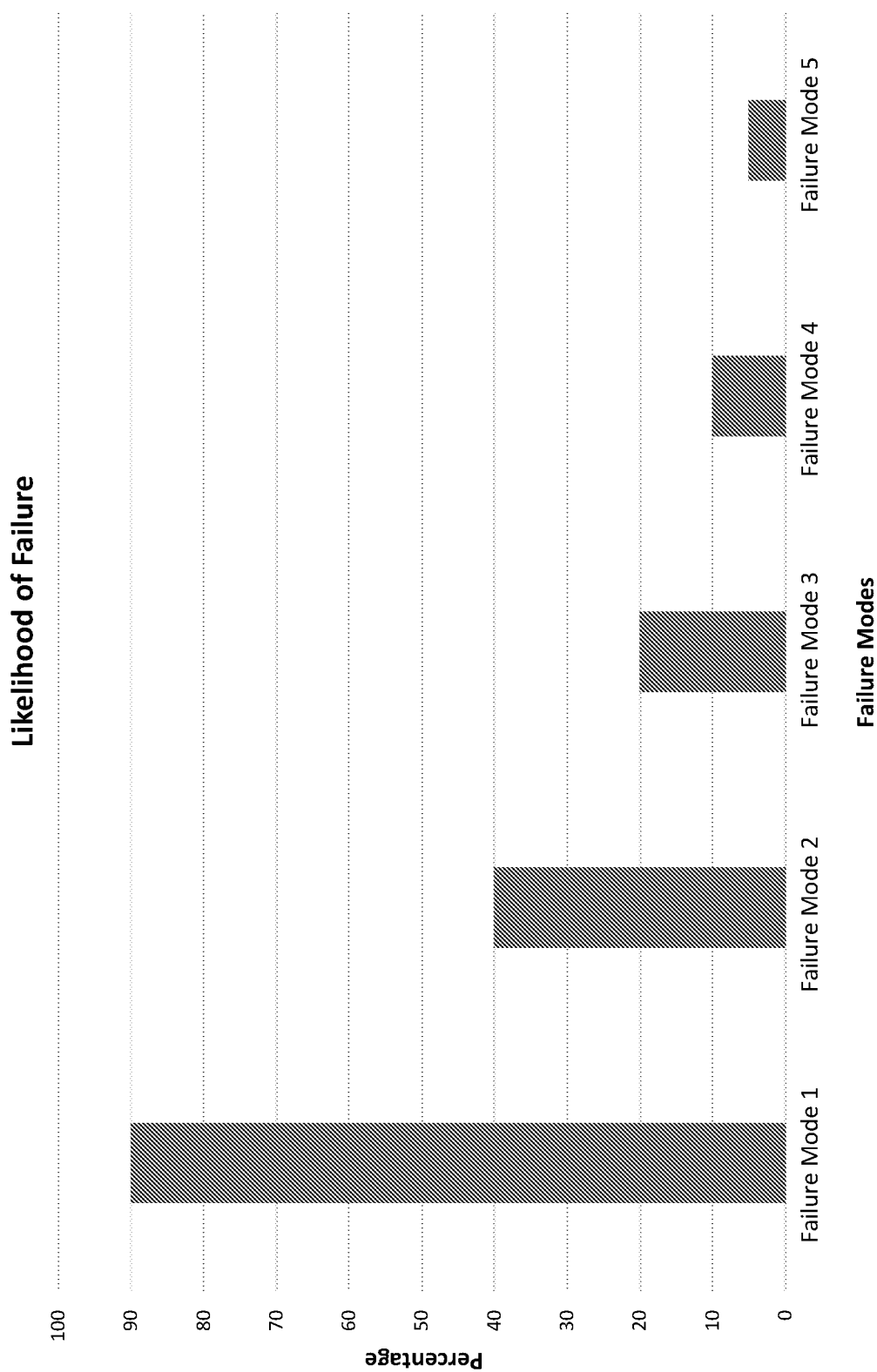
FIG. 4 is an illustrative embodiment of the results of the method of FIG. 3.

For example, as shown in FIG. 4, a representative chart or graph may be provided to the operator, technician, or others associated with engine system 10. Illustratively, FIG. 4 discloses that, for example, five failure modes may be identified as the most probable or likely failure modes out of the complete listing of failure modes for engine system 10. For example Failure Mode 1 could be a restriction within an exhaust-gas recirculation ("EGR") system of engine system 10, Failure Mode 2 could be a failure within the functional response of a variable-geometry turbocharger ("VGT") system of engine system 10, Failure Mode 3 could be a failure indicating an above-normal threshold reading for the differential pressure sensor of the EGR system, Failure Mode 4 could be a failure indicating a malfunction with the differential pressure sensor of the EGR system, and Failure Mode 5 could be a valve leak within the EGR system. Within this narrowed grouping or listing of the five most probable failure modes, ECM 40 is configured to further identify the individual probabilities or likelihoods of each of representative Failure Modes 1, 2, 3, 4, and 5. In the illustrative embodiment of FIG. 4, Failure Mode 1 is shown as being the most likely failure mode, thereby providing the operator or technician with a helpful way to look for, assess, and ultimately repair any fault within engine system 10.

Either at the same time as Step 66 or following Step 66, ECM 40 is configured to perform Step 68 which provides or otherwise displays action steps or instructions to the user or technician for correcting the identified fault or failure of engine system 10. For example, ECM 40 may transmit a list of step-by-step instructions letting the operator or technician how to find, assess, and fix the reason for the fault. In one embodiment, in Step 66, the results of method 50 are provided to a display of engine system 10 which visually provides the likelihood of failure and possible instructions associated with repairing the failure to an operator or technician. Alternatively, in Step 66, the results of method 50 and a list of instructions to repair the failure are displayed on an external tool/adapter 72 or other type of external computer-type device.

ECM 40 also is configured to perform Step 70 which provides results to any relevant parties associated with engine system 10. For example, ECM 40 may be configured to transmit information about method 50 and Steps 52-68 performed therein and/or the likelihood of failure modes identified to the original equipment manufacturer for engine system 10, the operator, an external database, a technician, a supplier associated with engine system 10, the current owner of engine system 10, and/or any other party (person or organization) associated with engine system 10. In this way, the results of method 50 may be used to repair a various components or systems of engine system 10, adjust various parameters of engine system 10, adjust various operations of engine system 10, and/or otherwise result in a repair, change, or adjustment to various components or systems of engine system 10. As such, the data and results produced by method 50 and control system 18 may be used to physically affect a change within or control engine system 10 based on the likelihood of failure modes identified.

Method 50 may be performed at various operating and non-operating times for engine system 10. For example, method 50 may be performed each time ECM 40 and/or engine diagnostics module 36 makes a diagnostic decision or receives a particular input. Additionally, method 50 may be performed on request of a service tool, for example during routine servicing of engine system 10.

Once method 50 is completed upon the detection of a fault or malfunction, engine diagnostics module 36 and/or ECM 40 may be configured to store an indicator (e.g., date or time stamp, etc.) indicating when method 50 was most recently completed. Additionally, ECM 40 and/or engine diagnostics module 36 may be configured to "reset" the diagnostics indicator to indicate that the input data received was gathered after the last time method 50 was performed.

Because ECM 40 is operably coupled to engine diagnostics module 36, no additional or external hardware, device, components, or tools are needed to perform the LLRT analysis of method 50. Rather, method 50 is performed merely using existing diagnostic data already present with engine system 10 and all data management and calculations are completed on ECM 40. Each time a diagnostics decision is made, the results may be updated and stored on ECM 40 and/or diagnostics module 36 such that, again, no external databases, devices, or hardware are required to perform method 50. Additionally, the results of method 50 may be communicated to the operator through a built-in display or indicator, thereby further containing the whole of method 50 to the existing engine system 10.

Alternatively, in one embodiment, an external tool or adapter 72 (FIG. 2) may be used to connect engine system 10 to an external computer or mobile device. In such an embodiment, filtering information, mean vectors, weighting matrices, and other information necessary for performing method 50 may be stored in off-board databases external to engine system 10. External tool or adapter 72 may be used to initiate and/or complete some or all of Steps 52-70 of method 50.

Further, in another embodiment, a remote system or application 74 (FIG. 2) may be connected to control system 18 via telemetry. Remote application 74 may be configured to initiate and perform method 50 and also may be used to store various data or information necessary for method 50, such as weighting matrices, mean vectors, filtering information, etc. Information may be transmitted between control system 18 and remote system/application 74 through a wired or wireless connection (e.g., Bluetooth) and/or with the use a personal computer, mobile application, cloud-based processing, etc.

While method 50 is disclosed as being a log-likelihood ratio method, method 50 also may be performed using vector projections, factor analysis, canonical correlation, or classifications instead of log-likelihood ratio analysis. Additionally, as disclosed herein, method 50 may be used to determine the likelihood of faults within various systems on a vehicle, such as an aftertreatment system.

In general, method 50 of the present disclosure seeks to isolate the most likely cause of a failure within engine system 10. By providing information regarding the most likely failure mode, the repair time for engine system 10 is decreased. Additionally, because method 50 uses existing diagnostic information and on-board sensors 34 for engine system 10, additional components, such as look-up tables, and external databases, are not required to perform method 50. As such, method 50 does not rely on Markov chains, set times, frequency information, Boolean or discrete fault status information nor does method 50 require an operator or technician to consult a look-up table or database. More particularly, Boolean or discrete information, such as pass/fail information, may contain less information about the state of the system. As such, a fault may not be recorded for a degraded component because the component has not yet completely failed and the system is only established to deliver pass/fail information based on a complete failure that is recorded. Additionally, in a system using Boolean or discrete information, a system level fault may be detected but there is no further information given regarding which part within the overall system has degraded or failed. Conversely, using the LLRT-analysis of the present application, which obtains non-discrete results and information based on other diagnostics, if a component has degraded, the diagnostic system contains more information about the system and, therefore, can provide information as to the degradation, even if a complete failure has not occurred.

Embodiments of the present disclosure are described by way of example only, with reference to the accompanying drawings. Further, the following description is merely illustrative in nature and is in no way intended to limit the disclosure, its application, or uses. As used herein, the term "unit" or "module" refers to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units, the scope of the present system should not be so limited since other modifications will become apparent to the skilled practitioner.

Furthermore, while the above description describes hardware in the form of a processor executing code, hardware in the form of a state machine, or dedicated logic capable of producing the same effect, other structures are also contemplated. Although the modules 36, 40 are illustrated as separate modules, the modules can be integrated and operated as a single module, and other suitable combinations of sub-modules are contemplated to suit different applications. Also, although the modules are illustratively depicted as separate modules, the functions and capabilities of each module can be implemented, combined, and used in conjunction with/into any unit or any combination of units to suit different applications.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A method for isolating a fault within an engine system including an engine control module and a diagnostics module, comprising:
   determining, by the engine control module, a plurality of parameters of the engine system;
   calculating a likelihood of a fault using a log-likelihood ratio analysis of data within the engine control module, the log-likelihood-ratio analysis being performed using a plurality of weighting vectors, at least some of the plurality of weighting vectors being associated with at least one failure mode detected in the engine system;
   providing a plurality of fault determinations and the likelihood of each of the plurality of fault determinations using the plurality of parameters and the diagnostics module of the engine system; and
   controlling the engine system based on the likelihood of each of the plurality of fault determinations.

2. The method of claim 1, wherein the plurality of parameters of the engine system are determined during operation of the engine system, and further comprising comparing the plurality of parameters to predetermined threshold parameters for the engine system.

3. The method of claim 2, further comprising:
normalizing the plurality of parameters using a statistical analysis;
filtering the normalized plurality of parameters based on data from the diagnostics module;
calculating the likelihood of the fault using the log-likelihood ratio analysis for each possible failure mode of the engine system;
comparing the likelihoods for each of the possible failure modes; and
providing instructions to address the possible failure modes with highest likelihoods.

4. The method of claim 3, wherein providing instructions includes visually displaying the possible failure modes with the highest likelihoods on a display.

5. The method of claim 4, wherein the display is present on at least one the engine system and an external tool.

6. A method of isolating a fault within an engine system, comprising:
receiving a plurality of input parameters from the engine system;
receiving a plurality of threshold values from the engine system;
calculating a plurality of average values and a plurality of weighting vectors based on the plurality of input parameters, at least some of the plurality of weighting vectors being associated with at least one failure mode detected in the engine system;
calculating a log-likelihood ratio for each of a plurality of failure modes detected in the engine system based on the plurality of input parameters, the plurality of average values, and the plurality of weighting vectors;
comparing, using the log-likelihood ratio, the plurality of input parameters to the plurality of threshold values;
determining the fault of the engine system by calculating a probability of each of the plurality of failure modes detected in the engine system based on the comparison between the plurality of input parameters and the plurality of threshold values; and
controlling the engine system based on the probability of each of the plurality of failure modes detected in the engine system.

7. The method of claim 6, further comprising normalizing the plurality of input parameters using a statistical analysis to account for one or more inconsistencies.

8. The method of claim 6, further comprising applying at least one filter to at least one of: the plurality of input parameters and the plurality of threshold values to narrow a list of possible failure modes.

9. The method of claim 8, wherein applying the at least one filter comprises applying a first filter to at least one of: the plurality of input parameters and the plurality of threshold values based on an operating condition of the engine system to remove one or more irrelevant failure modes.

10. The method of claim 8, wherein applying the at least one filter comprises applying a second filter to at least one of: the plurality of input parameters and the plurality of threshold values based on values associated with an incomplete diagnostic process performed in the engine system.

11. The method of claim 6, further comprising ranking the probability of each of the plurality of failure modes based on the log-likelihood ratio calculated for a corresponding failure mode.

12. The method of claim 11, further comprising providing at least one instruction for correcting the fault of the engine system based on the probability ranking of each of the plurality of failure modes detected in the engine system.

13. The method of claim 12, wherein providing the at least one instruction comprises displaying the at least one instruction on a display device.

14. The method of claim 12, wherein providing the at least one instruction comprises transmitting the at least one instruction to a relevant party associated with the engine system.

15. A diagnostic system of isolating a fault within an engine system, comprising:
an engine control module configured to:
receive a plurality of input parameters from the engine system;
receive a plurality of threshold values from the engine system; and
an engine diagnostic module configured to:
calculate a plurality of average values and a plurality of weighting vectors based on the plurality of input parameters, at least some of the plurality of weighting vectors being associated with at least one failure mode detected in the engine system;
calculate a log-likelihood ratio for each of a plurality of failure modes detected in the engine system based on the plurality of input parameters, the plurality of average values, and the plurality of weighting vectors;
compare, using the log-likelihood ratio, the plurality of input parameters to the plurality of threshold values;
determine the fault of the engine system by calculating a probability of each of the plurality of failure modes detected in the engine system based on the comparison between the plurality of input parameters and the plurality of threshold values; and
control the engine system based on the probability of each of the plurality of failure modes detected in the engine system.

16. The system of claim 15, wherein the engine diagnostic module is further configured to normalize the plurality of input parameters using a statistical analysis to account for one or more inconsistencies.

17. The system of claim 15, wherein the engine diagnostic module is further configured to apply at least one filter to at least one of: the plurality of input parameters and the plurality of threshold values to narrow a list of possible failure modes.

18. The system of claim 17, wherein the engine diagnostic module is further configured to apply a first filter to at least one of: the plurality of input parameters and the plurality of threshold values based on an operating condition of the engine system to remove one or more irrelevant failure modes.

19. The system of claim 17, wherein the engine diagnostic module is further configured to apply a second filter to at least one of: the plurality of input parameters and the plurality of threshold values based on values associated with an incomplete diagnostic process performed in the engine system.

20. The system of claim 15, wherein the engine diagnostic module is further configured to rank the probability of each of the plurality of failure modes based on the log-likelihood ratio calculated for a corresponding failure mode.

* * * * *